United States Patent
Frederick et al.

(10) Patent No.: US 11,305,741 B2
(45) Date of Patent: Apr. 19, 2022

(54) SENSOR CLEANING APPARATUS, SYSTEMS, AND RELATED METHODS FOR USE WITH VEHICLES

(71) Applicant: TOYOTA MOTOR ENGINEERING & MANUFACTURING NORTH AMERICA, INC., Plano, TX (US)

(72) Inventors: Scott L. Frederick, Brighton, MI (US); Ryan C. Harris, Saline, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 386 days.

(21) Appl. No.: 16/135,579

(22) Filed: Sep. 19, 2018

(65) Prior Publication Data

US 2020/0086833 A1   Mar. 19, 2020

(51) Int. Cl.
*B60S 1/56* (2006.01)
*B60S 1/08* (2006.01)
*B60S 1/52* (2006.01)
*B60S 1/04* (2006.01)
(Continued)

(52) U.S. Cl.
CPC ............ *B60S 1/566* (2013.01); *B60R 1/0602* (2013.01); *B60S 1/0411* (2013.01); *B60S 1/0822* (2013.01); *B60S 1/52* (2013.01); *B60S 1/522* (2013.01); *G02B 27/0006* (2013.01)

(58) Field of Classification Search
CPC ...... B60S 1/50; B60S 1/52; B60S 1/56; B60S 1/566; B60S 1/522; B60S 1/524; B60S 1/0822; B60S 1/0848; B60S 1/0818; B60S 1/485; B60S 1/0402; B60S 1/0411; B60S 1/62; B60R 1/00; B60R 1/04; B60R 1/06; B60R 1/0602; B05B 7/00; G01D 11/245; G01D 11/26; G01S 2007/4977; B08B 1/00; B08B 3/02; G02B 27/0006

See application file for complete search history.

(56) References Cited

U.S. PATENT DOCUMENTS 1,771,824 A * 7/1930 Storrie .................. B60S 1/3877
                                                    15/250.4
5,068,770 A * 11/1991 Baziuk .................... B60S 1/603
                                                    362/509
(Continued)

FOREIGN PATENT DOCUMENTS

DE         10117374    *  9/2002
DE      102013012522   *  1/2015
(Continued)

OTHER PUBLICATIONS

Machine language translation of description portion of Japanese publication 3-90451, published Apr. 1991. (Year: 1991).*

*Primary Examiner* — Gary K. Graham
(74) *Attorney, Agent, or Firm* — Oblon, McClelland, Maier & Neustadt, L.L.P.

(57) ABSTRACT

Sensor cleaning apparatus, systems, and related methods for use with vehicles are disclosed. A disclosed apparatus includes a sensor of a vehicle. The apparatus also includes a motor operatively coupled to the sensor to enable the sensor to move within a cavity of the vehicle. The apparatus also includes a wiper fixedly coupled to the vehicle and partially defining the cavity. An edge of the wiper is to engage the sensor when the sensor moves to remove debris.

15 Claims, 8 Drawing Sheets

(51) Int. Cl.
  *B60R 1/06*   (2006.01)
  *G02B 27/00*  (2006.01)

(56) References Cited

U.S. PATENT DOCUMENTS

| | | | |
|---|---|---|---|
| 7,965,336 B2 * | 6/2011 | Bingle | H04N 5/374 |
| | | | 348/374 |
| 9,278,670 B2 * | 3/2016 | Hattori | B60S 1/0848 |
| 9,602,703 B1 | 3/2017 | Raphael | |
| 9,731,688 B2 | 8/2017 | Doorley et al. | |
| 10,179,571 B1 * | 1/2019 | Matesic | G03B 17/02 |
| 10,859,818 B2 * | 12/2020 | Slama | H04N 5/2252 |
| 2014/0036132 A1 * | 2/2014 | Pawlowski | G02B 27/0006 |
| | | | 348/335 |
| 2016/0244028 A1 | 8/2016 | Wakatsuki | |
| 2917/0210351 | 7/2017 | Mahmoud et al. | |
| 2017/0349147 A1 * | 12/2017 | Blank | B60S 1/56 |
| 2018/0009418 A1 | 1/2018 | Newman | |
| 2019/0039531 A1 * | 2/2019 | Wilson | B60S 1/0818 |
| 2019/0041234 A1 * | 2/2019 | Ghannam | B60S 1/56 |

FOREIGN PATENT DOCUMENTS

| | | | |
|---|---|---|---|
| DE | 10 2016 006 039 A1 | | 11/2016 |
| DE | 102016008064 | * | 12/2016 |
| JP | 3-90451 | * | 4/1991 |

* cited by examiner

SENSOR CLEANING APPARATUS, SYSTEMS, AND RELATED METHODS FOR USE WITH VEHICLES

FIELD OF THE DISCLOSURE

This disclosure relates generally to vehicles and, more particularly, to sensor cleaning apparatus, systems, and related methods for use with vehicles.

BACKGROUND

Motor vehicles typically employ sensor systems to improve vehicle performance, safety, and/or driver comfort. For example, a vehicle having autonomous functionality (sometimes referred to as an autonomous vehicle) utilizes sensors positioned on a roof, a fender, a side panel, etc. to detect parameters associated with the vehicle and/or a driving surface, which enables a controller to drive the vehicle without assistance from a driver. To ensure proper autonomous vehicle control, these sensors need to be properly maintained.

SUMMARY

An example apparatus includes a sensor of a vehicle. The apparatus also includes a motor operatively coupled to the sensor to enable the sensor to move within a cavity of the vehicle. The apparatus also includes a wiper fixedly coupled to the vehicle and partially defining the cavity. An edge of the wiper is to engage the sensor when the sensor moves to remove debris.

An example vehicle includes a cavity formed by an exterior surface of the vehicle to receive a sensor. The vehicle also includes a wiper partially defining the cavity to engage the sensor when the sensor moves to remove debris. The vehicle also includes a seal partially defining the cavity to engage the sensor.

An example tangible machine-readable medium includes instructions that, when executed, cause a processor to at least obtain sensor data associated with a vehicle. The instructions also cause the processor to detect debris on a sensor of the vehicle based on the sensor data. The instructions also cause the processor to move, via a motor, the sensor relative to a wiper and a seal that are coupled to the vehicle. The wiper and the seal are to engage the sensor when the sensor moves to remove the debris and a fluid associated with removing the debris.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Some known sensor cleaning systems clean sensors of a vehicle when an obstruction or debris is adversely affecting autonomous vehicle functionality. For example, bugs, dirt, dust, snow, etc. may build up directly on a sensor or glass in front of the sensor during vehicle use, which impedes the sensor from properly operating. Typically, when such obstructions are detected, a known sensor cleaning system applies a cleaning fluid onto the affected sensor and moves (e.g., via a motor) wipers to clean the sensor. However, these known systems may incur substantial costs due to components and/or complex assemblies that are required to control movement of the wipers and operatively couple the wipers to the vehicle. Further, the above-mentioned known sensor cleaning systems may fail to effectively clean vehicle sensors resulting from a limited range of movement of the wipers. Further still, such known systems may not effectively remove the cleaning fluid from the sensor, thereby allowing the cleaning fluid and/or other fluid(s) to leak into and/or otherwise buildup in vehicle compartments near the sensor.

Sensor cleaning apparatus, systems, and related methods for use with vehicles are disclosed. Examples disclosed herein detect when debris is on one or more sensors of a vehicle based on vehicle sensor data that indicates such a sensor condition, for example, by identifying and/or determining one or more particular signatures in the sensor data. In response, examples disclosed herein enable the sensor(s) to move (e.g., via a motor and/or an actuator) relative to a wiper coupled to the vehicle to remove the debris, which improves sensor functionality as well as vehicle safety during autonomous vehicle operation. In particular, the disclosed wiper has an edge that maintains engagement (e.g., via flexing and/or straining) with an outer surface of the sensor as the sensor moves within a vehicle cavity. In this manner, the wiper is able to clean a substantially large area of the sensor surface. As a result, disclosed examples reduce costs typically associated with the above-mentioned known sensor cleaning systems by reducing components and/or design complexity that would have otherwise been required.

Additionally, some disclosed examples provide a seal that is coupled to the vehicle and engages the outer surface of the sensor, which effectively removes a fluid (e.g., sprayed onto the sensor via a nozzle) and/or otherwise isolates a disclosed vehicle cavity. As a result, the fluid (and/or other fluid(s)) is substantially prevented from leaking into and/or otherwise entering a vehicle cavity.

In some examples, a disclosed cavity extends into an exterior surface of the vehicle to receive the sensor. In such examples, the cavity is sized, shaped, structured, and/or otherwise configured to sufficiently contain the sensor and/or one or more components (e.g., a motor, an actuator, a mounting plate, one or more wires for providing communication and/or power, etc.) associated therewith. In some examples, another disclosed cavity to receive the sensor is defined by a cover or enclosure (sometimes referred to as a sensor cover) that is positioned on a portion of the exterior surface such as a roof of the vehicle.

Figures 1A, 1B, 1C:
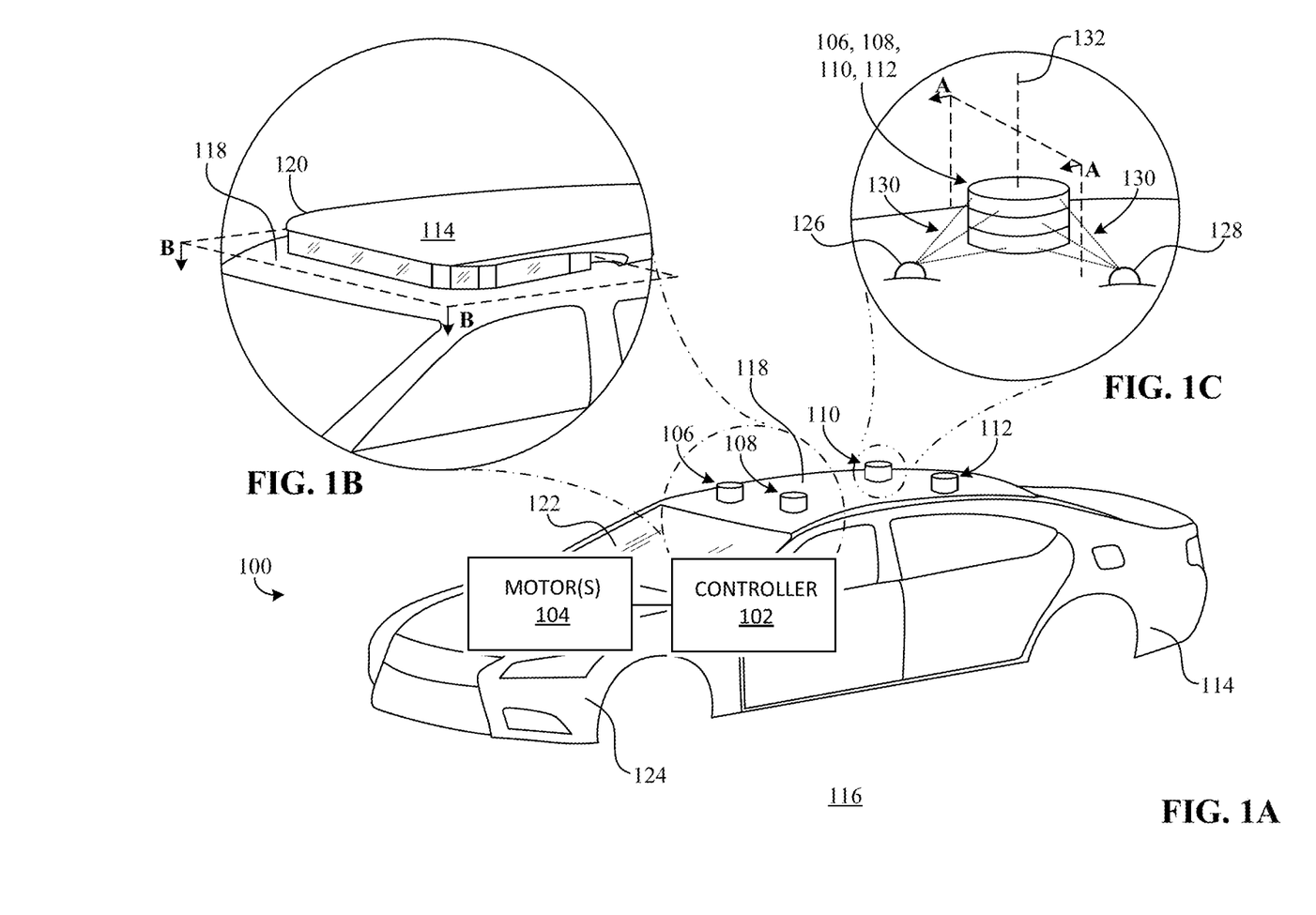
FIG. 1A is a view of an example vehicle in which examples disclosed herein can be implemented.
FIG. 1B is an enlarged partial-view of the example vehicle of FIG. 1A and shows and example sensor enclosure.
FIG. 1C is an enlarged partial-view of the example vehicle of FIG. 1A and shows an example sensor.

FIG. 1A is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example controller 102, one or more motors 104, and one or more example sensors 106, 108, 110, 112, four of which are shown in this example (i.e., a first sensor 106, a second sensor 108, a third sensor 110, and a fourth sensor 112). In particular, the controller 102 determines, via the sensor(s) 106, 108, 110, 112, a particular condition of the vehicle 100 indicative of obstruction(s) and/or debris (e.g., dirt, dust, bugs, snow, road debris, etc.) that may interfere with vehicle functionality (e.g., autonomous functionality). In response to determining the condition, the controller 102 advantageously controls the motor(s) 104 (e.g., to move the sensor(s) 106, 108, 110, 112 and/or spray a fluid thereon), thereby removing the debris, which is discussed in greater detail below in connection with FIGS. 1B, 1C, 2, 3, 4A, 4B and 5-8.

The controller 102 of FIG. 1A may be implemented, for example, using one or more electronic control units (ECUs). In particular, the controller 102 is communicatively coupled to the sensor(s) 106, 108, 110, 112 to receive data therefrom and the motor(s) 104 to control output thereof (e.g., a force and/or a torque), for example, via a transmission or signal wire, a bus (e.g., a control area network (CAN)), radio frequency, etc.

The sensor(s) 106, 108, 110, 112 of FIG. 1A include one or more light detection and ranging units (sometimes referred to as LiDAR(s)), one or more radar units, one or more cameras, one or more proximity sensors, and/or any other suitable sensor(s) that enable or facilitate autonomous functionality for the vehicle 100, improve vehicle performance, and/or improve vehicle safety. In particular, the sensor(s) 106, 108, 110, 112 are disposed on or proximate to an exterior surface 114 of the vehicle 100 and configured to generate, obtain, and/or otherwise provide data associated with the vehicle 100 and/or a driving surface (e.g., concrete, asphalt, dirt, etc.) 116 on which the vehicle 100 is positioned. For example, the sensor(s) 106, 108, 110, 112 may provide data that identifies and/or indicates positions of objects proximate to the vehicle 100, lane markers, other vehicles, pedestrians, etc.

As shown in FIG. 1A, the sensor(s) 106, 108, 110, 112 are operatively coupled to the vehicle 100 and positioned on a roof 118 thereof. In some examples, the sensor(s) 106, 108, 110, 112 are disposed in an example vehicle cover or enclosure 120 (FIG. 1B) (sometimes referred to as a sensor or vehicle enclosure) that is coupled to a portion of the roof 118, as discussed in greater detail below in connection with FIG. 5. Additionally or alternatively, in some examples, one or more of the vehicle sensor(s) 106, 108, 110, 112 are disposed on or near a different portion of the vehicle 100 such as, for example, a vehicle windshield 122, a vehicle fender 124, or any other suitable location.

According to the illustrated example of FIG. 1B, the enclosure 120 protrudes from the vehicle 100 to extend the exterior surface 114 and provide a sufficient field of view to one or more of the sensor(s) 106, 108, 110, 112 disposed therein. The enclosure 120 of FIG. 1B may have any suitable size, shape, and/or structure to sufficiently contain the sensor(s) 106, 108, 110, 112 and/or component(s) associated therewith (e.g., one or more of the motor(s) 104). Although FIG. 1B depicts the enclosure 120 as being positioned on the roof 118, in other examples, the enclosure 120 may be positioned on any other suitable location of the vehicle 100.

According to the illustrated example of FIG. 1C, one or more example nozzles 126, 128 are operatively coupled to the vehicle 100, two of which are shown in this example (i.e., a first nozzle 126 and a second nozzle 128). In particular, the nozzle(s) 126, 128 are positioned proximate to at least one of the sensor(s) 106, 108, 110, 112 and configured to spray a fluid 130 thereon. That is, in some examples, one or more (e.g., each) of the other sensor(s) 106, 108, 110, 112 of the vehicle 100 are similarly provided with respective nozzle(s) to receive the fluid 130. The fluid 130 of FIG. 3 may include one or more chemicals (e.g., alcohol) to facilitate cleaning debris such as methanol (sometimes referred to as wiper or washer fluid). As shown in FIG. 1C, the nozzle(s) 126, 138 are radially distributed relative an axis 132 of the sensor(s) 106, 108, 110, 112, which facilitates application of the fluid 130.

Figure 2:
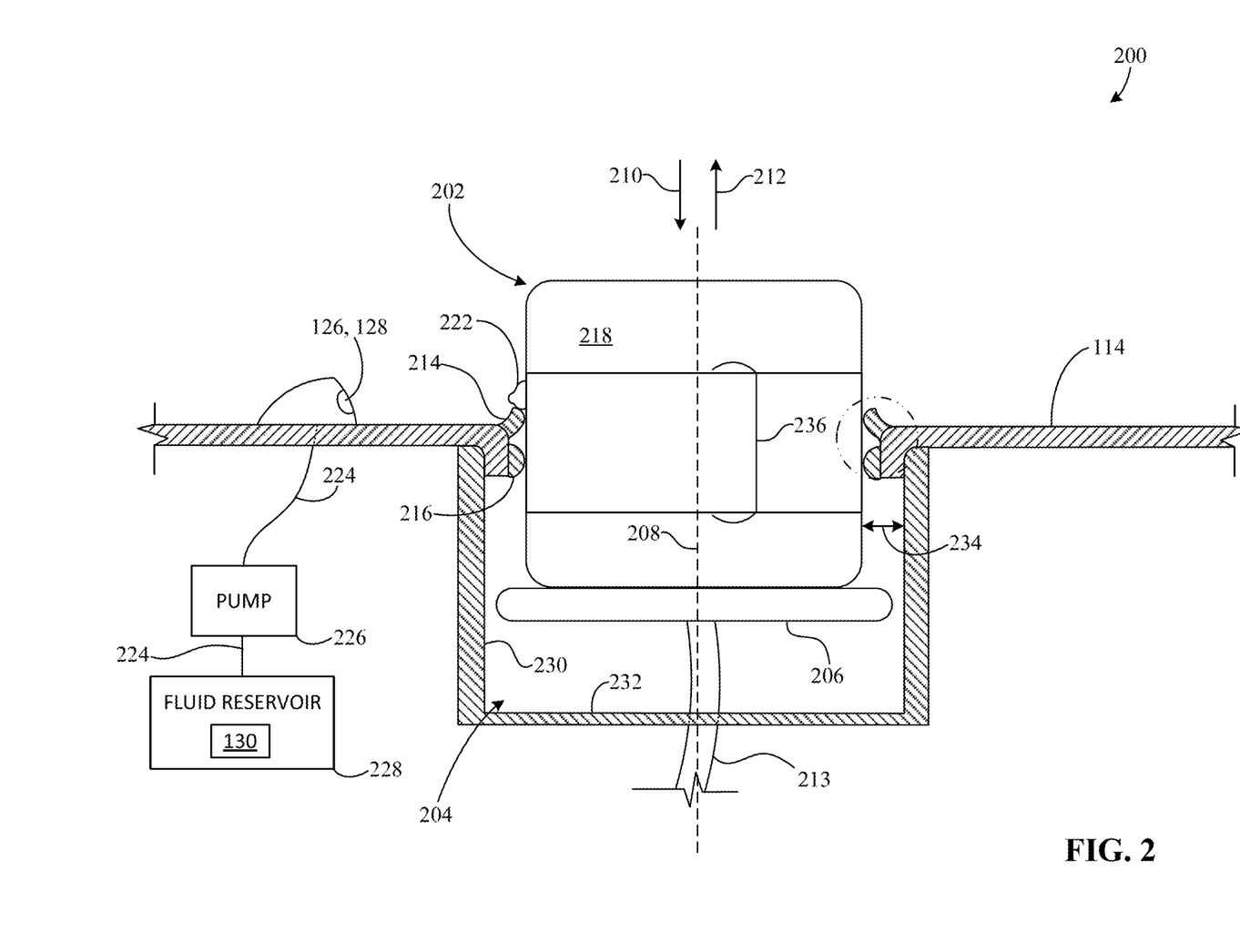
FIGS. 2 and 3 are partial cross-sectional views of the example vehicle of FIG. 1A along line A-A and show an example configuration of an example sensor in accordance with the teachings of this disclosure.

FIG. 2 is a partial cross-sectional view of the example vehicle 100 of FIG. 1A along line A-A and shows a first example configuration 200 of a fifth example sensor 202 in accordance with the teachings of this disclosure. In some examples, the fifth sensor 202 of FIG. 2 corresponds to one or more of the sensor(s) 106, 108, 110, 112 of FIGS. 1A and 1C. According to the illustrated example of FIG. 2A, the fifth sensor 202 is disposed in a first example cavity 204 of the vehicle 100 that is positioned on a portion (e.g., the roof 118) of the exterior surface 114. In particular, the first cavity 204 is sized, shaped, structured, and/or otherwise configured to receive the fifth sensor 202 and allow sufficient movement thereof.

To facilitate moving the fifth sensor 202 into or out of the first vehicle cavity 204, a mounting plate 206 is operatively coupled between the fifth sensor 202 and at least one of the motor(s) 104. In particular, the motor(s) 104 impart a force and/or a torque on the mounting plate 206, thereby moving the plate 206 along an axis 208 of the first cavity 204 in a first direction 210 and/or a second direction 212 that is opposite the first direction 210. As a result, the fifth sensor 202 of FIG. 2 moves (e.g., linearly) between first and second positions (e.g., raised and lowered positions). As shown in FIG. 2, the fifth sensor 202 is in a partially raised position. Additionally, in some examples, the motor(s) 104 enable the fifth sensor 202 to rotate, which may further aid in debris removal. In any case, to provide communication and/or power to the fifth sensor 202 and/or the motor(s) 104, one or more cables or wires 213 (sometimes referred to as a wire harness) extend through at least a portion of the first cavity 204 from the vehicle 100 to the plate 206.

As the fifth sensor 202 moves through the first cavity 204, a first example wiper 214 and/or a first example seal 216 engage an outer surface 218 of the sensor 202, thereby removing example debris 222 on the surface 218, which is discussed further below. In some examples, the first wiper 214 and/or the first seal 216 of FIG. 2 are fixedly coupled to the vehicle 100 to substantially maintain a position and/or an orientation thereof as the fifth sensor 202 moves.

In some examples, to facilitate cleaning and/or otherwise removing the debris 222, one or more of the nozzle(s) 126, 128 spray the fluid 130 onto at least a portion of the surface 218 before and/or during movement of the fifth sensor 202. The nozzle(s) 126, 128 may be fluidly coupled (e.g., via fluid line 224) to a pump 226 to receive the fluid 130. In particular, at least one of the motor(s) 104 is operatively coupled to the pump 226 to control a parameter (e.g., a fluid pressure, a flow rate, etc.) of the fluid 130 and, as a result, enable the nozzle(s) 126, 128 to spray or otherwise expel the fluid 130 therefrom and toward the fifth sensor 202. In some examples, the pump 226 draws and/or receives the fluid 130 from a fluid reservoir 228 in the vehicle 100 that contains the fluid 130. As such, the pump 226 may be fluidly coupled (e.g., via the fluid line 224) to the fluid reservoir 228.

The first cavity 204 of FIG. 2 is formed and/or defined by a portion (e.g., the roof 118 and/or the enclosure 120) of the exterior vehicle surface 114 and/or one or more vehicle components. As shown in FIG. 2, the first cavity 204 extends into the exterior surface 114 to receive the fifth sensor 202 and provide a first inner surface (e.g., a circumferential wall) 230 and a second surface (e.g., a flat or even surface) 232 inner surface. As such, in some examples, one or more of the exterior surface 114, the enclosure 120, the first wiper 214, the first seal 216, the first inner surface 230, and/or the second inner surface 232 form and/or define the first cavity 204. That is, in some examples, the first wiper 214 and/or the first seal 216 are positioned in the first cavity 202. In some examples, the first wiper 214 and/or the first seal 216 are positioned external to the first cavity 202 and adjacent to the first inner surface 230.

In some examples, the first cavity 204 has a shape that matches a shape of the fifth sensor 202 such that a relatively small gap (e.g., 0.1 inches, 0.5 inches, 1 inch, etc.) 234 may exist between sensor surface 218 and the first surface 230. For example, the first cavity 204 has a cross-sectional shape that is similar to and/or otherwise matches a cross-sectional shape of the fifth sensor 202. In some examples, the cross-sectional shapes of the respective first cavity 204 and the fifth sensor 202 are curved (e.g., circular, oval, etc.) and/or polygonal (e.g., triangular, square, rectangular, pentagonal, etc.). Stated differently, the first cavity 204 may include a contour having a shape that is substantially the same (e.g., slightly larger) relative to a shape of a contour of the fifth sensor 202.

As shown in the illustrated example of FIG. 2, the fifth sensor 202 is substantially cylindrical such that the outer surface 218 defines a circumference of the fifth sensor 202. As such, in this example, the first cavity 204 has a shape that is substantially cylindrical. However, in some examples, the sensor 202 is shaped differently. As shown in FIG. 2, a particular portion or area 236 (sometimes referred to as a sensing area or surface) of the outer surface 218 extends at least partially around the fifth sensor 202, which provides a field of view (e.g., 360 degrees, 180 degrees, etc.) to the fifth sensor 202. For example, this area 236 of the outer surface 218 may be transparent and/or otherwise configured to allow light to pass into the fifth sensor 202 and/or emit out therefrom. Accordingly, some disclosed examples move the fifth sensor 202 along the axis 208 through predetermined linear range of movement (e.g., 1 inch, 2 inches, 3 inches, etc.) such that the first wiper 214 and/or the first seal 216 engage and/or otherwise clean this particular area 236.

Additionally, in some examples, the first wiper 214 and/or the first seal 216 have respective shapes that match the shape(s) associated with the first cavity 204 and/or the fifth sensor 202. For example, when the fifth sensor 202 is cylindrical, the first wiper 214 and/or the first seal 216 are substantially curved (e.g., circular). In some such examples, the first seal 216 is implemented as an O-ring.

According to the illustrated example of FIG. 2, the first wiper 214 of FIG. 2 surrounds the entire fifth sensor 202. Further, in some examples, the first wiper 214 and the fifth sensor 202 are concentric, as shown in FIG. 2. Similarly, the first seal 216 of FIG. 2 surrounds the entire fifth sensor 202 and/or is concentric therewith. However, in some examples, the first wiper 214 and/or the first seal 216 only partially surround the fifth sensor 202 or surround one or more portions thereof (e.g., a portion of the fifth sensor 202 having the area 236 and/or facing a direction of vehicle travel). That is, in some examples, the first wiper 214 is segmented or has more than one portion, and the first seal 216 is segmented or has more than one portion.

In some examples, one of the motor(s) 104 is coupled directly to a portion of the mounting plate 206 (i.e., the motor 104 is positioned in the cavity) such that the motor 104 moves with plate 206. In other examples, the motor 104 is coupled to a portion of the inner surface(s) 230, 232 and/or disposed in a receptacle formed thereby (i.e., the motor 104 is stationary or does not move with the plate 206). In any case, the motor 104 controls one or more actuators (e.g., linear actuator(s) and/or rotary actuator(s)) that are operatively coupled to the mounting plate 206 and the motor 104. For example, a linear actuator may extend between the second surface 232 and the plate 206.

Figure 3:
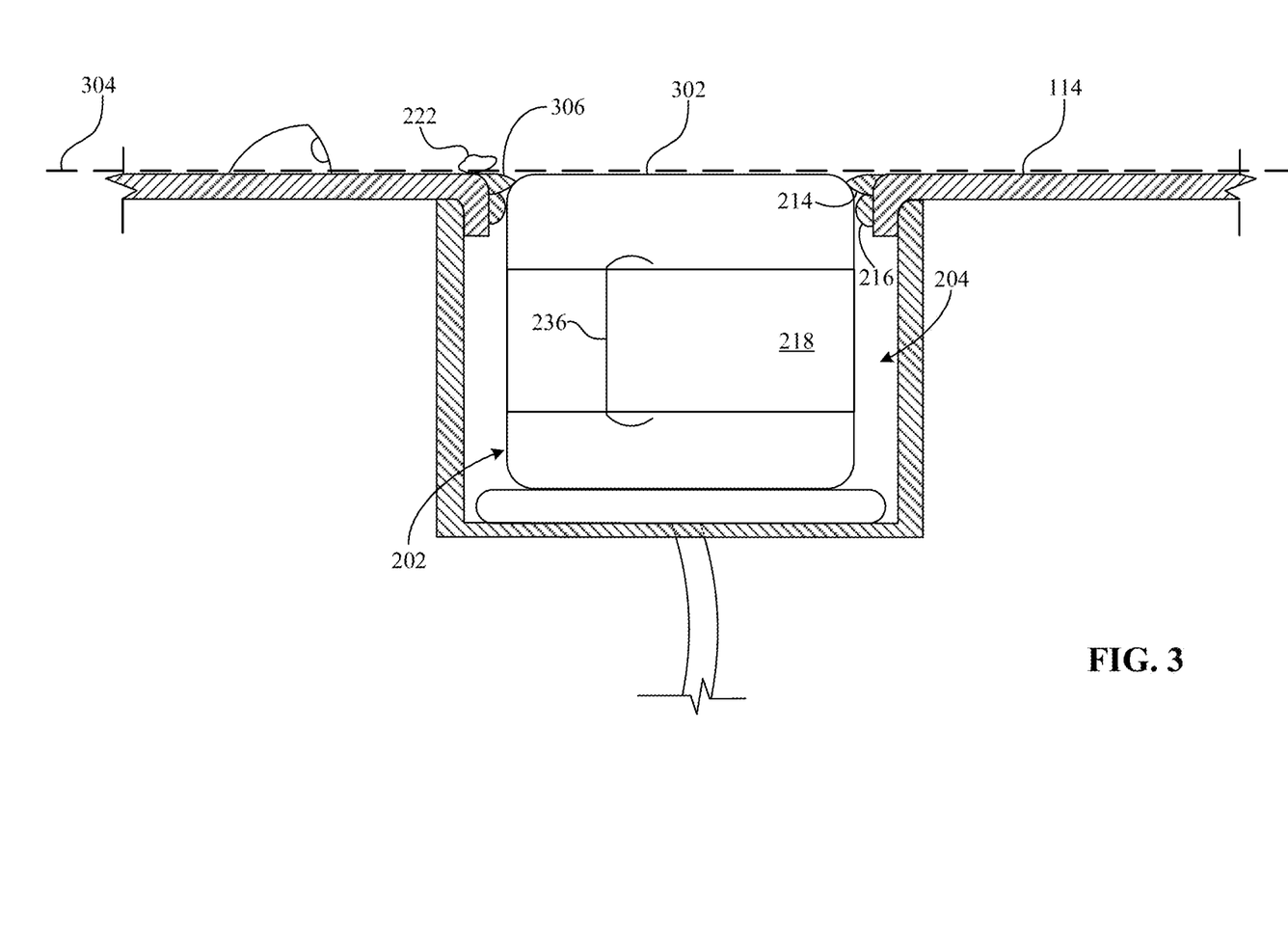

According to the illustrated example of FIG. 3, the fifth sensor 202 is in a lowered position (sometimes referred to as a seated position) within the first vehicle cavity 204, and the debris 222 is substantially removed from the sensing area 236 of the fifth sensor 202. After moving to the lowered position, the fifth sensor 202 then moves toward and/or returns to a raised position. In some examples, the fifth sensor 202 moves repeatedly between the raised and lowered positions to ensure the debris 222 is sufficiently removed. Although, in some examples, the fifth sensor 202 remains in the lowered position (e.g., when the vehicle 100 is not in operation), which may prevent debris buildup.

In some examples, when in the lowered position, the sensor 100 is discreetly positioned and/or oriented within the first cavity 204 such that the fifth sensor 202 is not noticeable and/or is flush with the exterior surface 114 of the vehicle 100, which may desirable to a driver or vehicle owner. For example, as shown in FIG. 3, a side or portion (e.g., an upper portion) 302 of the outer surface 218 is proximate to (e.g., positioned at, above, or below) a plane 304 formed by the exterior vehicle surface 114. That is, in some examples, a distance between the portion 302 and the plane 304 is about 1 inch or less. Additionally or alternatively, in some examples, an outer surface 306 of the first wiper 214 is similarly proximate to (e.g., positioned at, above, or below) the plane 304 and/or the portion 302 of the fifth sensor 202.

Figure 4A:
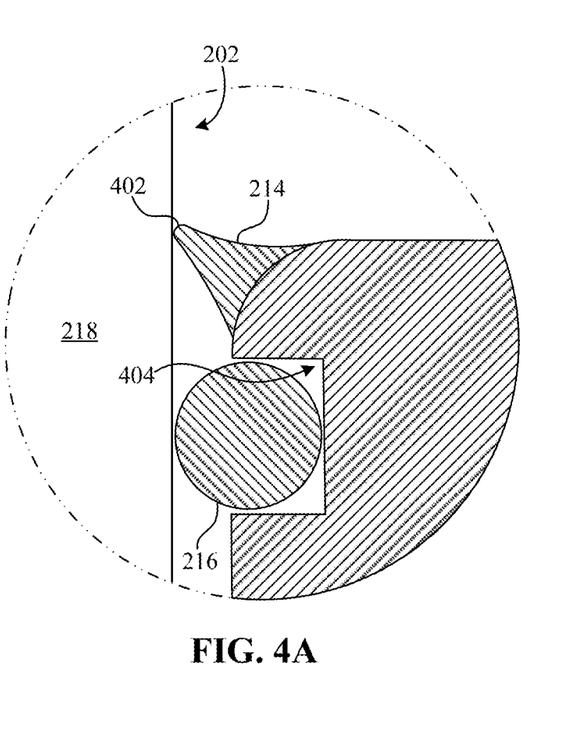
FIGS. 4A and 4B are enlarged portion-views of the example sensor of FIG. 2 and show an example wiper and an example seal in accordance with the teachings of this disclosure.

FIG. 4A is an enlarged portion-view of the fifth sensor 202 of FIGS. 2 and 3 and shows the first wiper 214 and the first seal 216. The first wiper 214 of FIG. 4A may be constructed of one or more elastic and/or durable materials (e.g., plastic and/or rubber) and/or any other suitable material having sufficient strength, rigidity, and/or elasticity to enable debris removal. According to the illustrated example of FIG. 4A, the first wiper 214 includes an edge 402 that maintains engagement with the sensor surface 218. As the fifth sensor 202 moves, the first wiper 214 may flex and/or strain to conform to a shape of the outer surface 218 and/or otherwise maintain engagement therewith. Further, in some examples, the first wiper 214 sealingly engages the surface 218 such that the fluid 130 is substantially removed in addition to the debris 130. Accordingly, some disclosed examples provide only a wiper (e.g., the first wiper 214) to remove the debris without an associated seal. The first seal 216 of FIG. 4A may be similarly constructed of one or more elastic and/or durable materials (e.g., plastic and/or rubber) and/or any other suitable material to enable fluid removal. Additionally, in some examples, the first seal 216 maintains engagement with the outer surface 218, thereby isolating the first cavity 204 from an outside environment.

In some examples, the first seal 216 is at least partially disposed in a first example seal groove (e.g., an annular groove) 404, as shown in FIG. 4A. In particular, the first groove 404 of FIG. 4A is sized, shaped, and/or otherwise configured to receive the first seal 216 and substantially maintain a position and/or an orientation thereof as the fifth sensor 202 moves. In some examples, the first groove 404 is formed and/or defined by the exterior vehicle surface 114, the enclosure 120, and/or the first inner surface 230. In some examples, the first groove 404 extends entirely around the surface 218 of the fifth sensor 202 or around one or more portions thereof. As shown in FIG. 4A, the first groove 404 has a cross-sectional shape that is substantially rectangular (e.g., square) such that a relatively small space exists between an outer surface of the first seal 216 and one or more surfaces formed by the first groove 404. However, in some examples, the cross-sectional shape of the first groove 404 is curved such that the outer surface of the first seal 216 substantially engages and/or matches the surface(s) formed by the first groove 404.

Figure 4B:
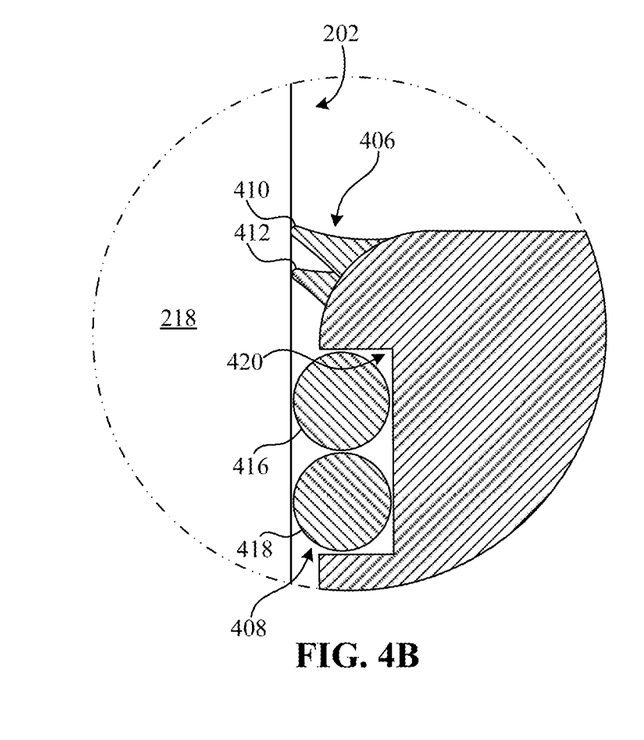

FIG. 4B is an enlarged portion-view of the fifth sensor 202 of FIGS. 2 and 3 and shows an example second wiper 406 and an example second seal 408 in accordance with the teachings of this disclosure. According to the illustrated example of FIG. 4B, the second wiper 406 includes first and second edges 410, 412 (sometimes referred to as a double or dual blade), each of which engages the surface 218 of the fifth sensor 202. In such examples, the second wiper 406 may remove debris from the fifth sensor 202 in a more effective manner. For example, the second edge 412 removes portion(s) of debris and/or fluid that may have been missed by the first edge 410. As a result, the fifth sensor 202 can be cleaned faster and/or with less movement. That is, the fifth sensor 202 may be sufficiently clean by moving from the raised position, to the lowered position, and back to the raised position.

According to the illustrated example of FIG. 4B, the second seal 408 includes first and second O-rings 414, 416 (sometimes referred to as a double or dual seal) that are disposed in a second example seal groove (e.g., an annular groove) 420, each of which sealingly engages the surface 218 to remove the fluid 130. In such examples, the second seal 408 may remove the fluid 130 from the fifth sensor 202 in a more effective manner compared to a single O-ring. In some examples, the first O-ring 416 engages and/or is operatively coupled to the second O-Ring 418 to substantially maintain a position thereof. In other examples, the first O-ring 416 is spaced from the second O-ring 418 (e.g., the first and second O-rings 416, 418 are disposed in respective seal grooves instead of the single seal groove 420).

Although FIGS. 2, 3, 4A, and 4B disclose particular aspects associated with a single sensor (i.e., the fifth sensor 202), such aspects may likewise apply to one or more other vehicle sensors (e.g., one or more of the first sensor 106, the second sensor 108, the third sensor 110, etc.). Further, although particular aspects of the wipers 214, 406 and seals 216, 408 have been disclosed in connection with the first sensor configuration 200, such aspects may likewise apply to other sensor configurations (e.g., the second configuration 500), as discussed below.

Figure 5:
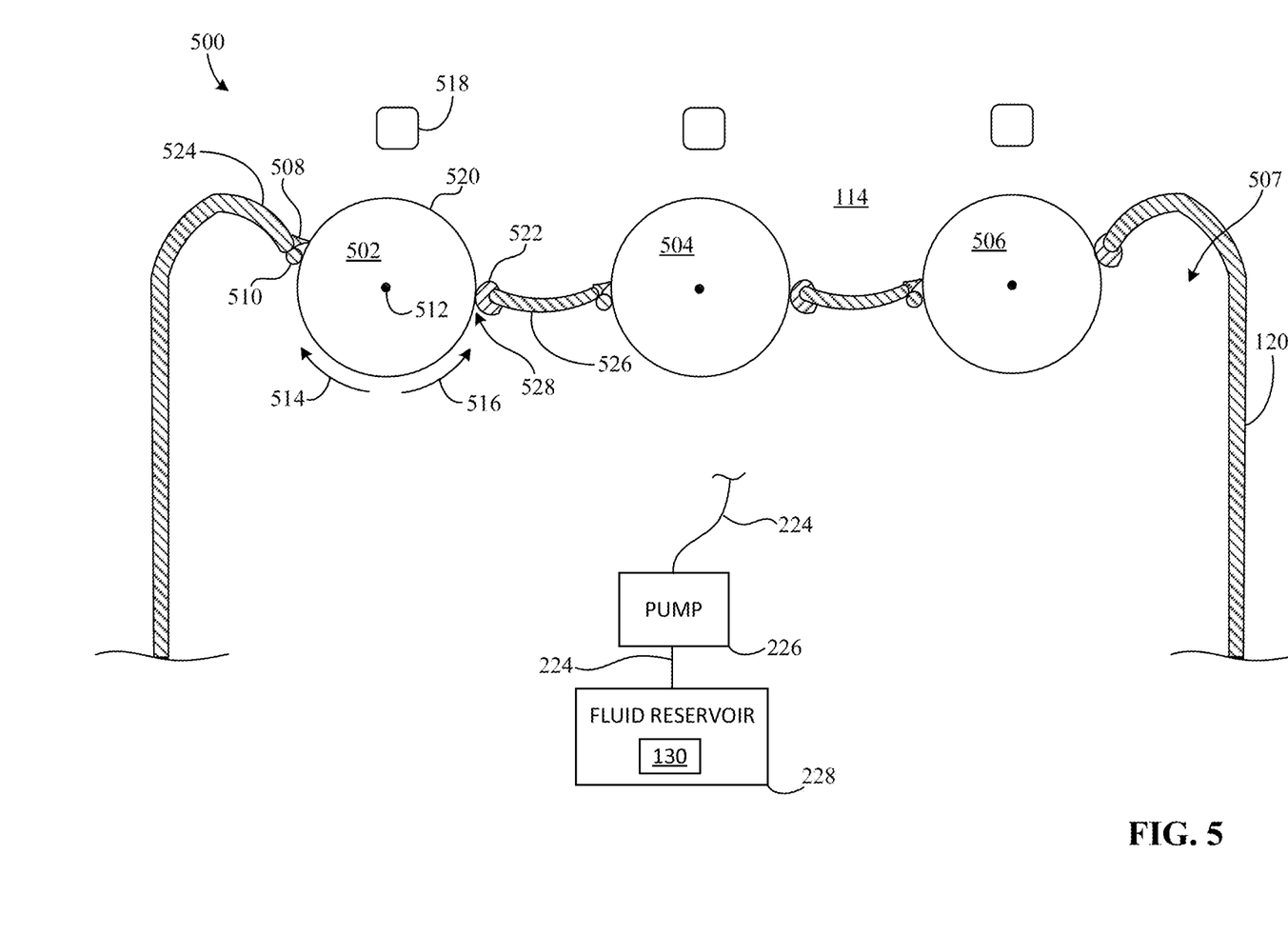
FIG. 5 is a cross-sectional view of the example vehicle of FIG. 1A along line B-B and shows another example configuration of example sensors in accordance with the teachings of this disclosure.

FIG. 5 is a cross-sectional view of the example vehicle of FIG. 1A along line B-B and shows a second example configuration 500 of one or more example sensors 502, 504, 506 (three of which are shown in this example) in accordance with the teachings of this disclosure. That is, the second configuration 500 includes an example sixth sensor 502, an example seventh sensor 504, and an example eighth sensor 506. In particular, the sensor(s) 502, 504, 506 of FIG. 5 are at least partially disposed in a second example cavity 507 of the vehicle 100. For simplicity, aspects will be discussed with respect to the sixth sensor 502. However, such aspects may likewise apply to one or more other sensors such as the seventh sensor 504 and/or the eighth sensor 506.

In FIG. 5, the sixth sensor 502 is operatively coupled to a third example wiper 508 to enable the removal of debris and/or fluid from the sixth sensor 502. The third wiper 508 of FIG. 5 may have a single edge or multiple edges that maintain(s) engagement with the sixth sensor 502, as previously disclosed above. Additionally, in this example, the sixth sensor 502 is operatively coupled to a third example seal 510 (sometimes referred to as a primary seal) to facilitate removal of the fluid 130. The third seal 510 may include a single component or multiple components, as previously disclosed above.

According to the illustrated example of FIG. 5, the sixth sensor 502 is operatively coupled to one more of the motor(s) 104 and/or otherwise configured to receive force and/or torque therefrom. As a result of the motor(s) 104 imparting the force and/or the torque on the sixth sensor 502, the sixth sensor 502 rotates relative to an axis 512 thereof in a first rotational direction (e.g., clockwise) 514 and/or a second rotational direction (e.g., counterclockwise) 516 opposite the first rotational direction 514 between third and fourth positions. This movement enables the third wiper 508 and/or the third seal 510 to effectively remove the debris and/or the fluid 130 from a sensing surface of the sixth sensor 502.

In some examples, to facilitate application of the fluid 130, a third example nozzle 518 is coupled to the vehicle 100 proximate to the sixth sensor 502 and operatively coupled to the pump 226 and/or the fluid reservoir 228 via the fluid lines 224. As such, in response to the pump 226 changing the parameter(s) of the fluid 130, the third nozzle 518 of FIG. 5 sprays the fluid 130 onto at least a portion of an outer surface 520 of the sixth sensor 502. Further, in some examples, one or more other nozzles are coupled to the vehicle 100 (e.g., radially distributed relative to the axis 512) and configured to the spray the fluid 130 onto the sixth sensor 502.

Additionally, in some examples, the sixth sensor 502 is operatively coupled to a fourth seal 522 (sometimes referred to as a secondary seal), which may further prevent the fluid 130 from entering the second cavity 507 and/or better isolate the second cavity 507 from an outside environment cooperatively with the third seal 510. The fourth seal 522 of FIG.

5 is spaced from the third seal 510 such that the sixth sensor 502 is positioned between the third and fourth seals 510, 522. In particular, the third seal 510 is effective in removing the fluid 130 when the sixth sensor 502 rotates in the second rotational direction 516, and the fourth seal 522 is effective in removing the fluid 130 when the sixth sensor 502 rotates in the first rotational direction 514.

The third wiper 508 of FIG. 5 is coupled to a first wall 524 of the vehicle enclosure 120 and extends along the axis 512 between opposing sides (e.g., from a top-most portion to a bottom-most portion) of the sixth sensor 502. Further, as shown in FIG. 5, the third seal 510 is also coupled to the first wall 524, and the fourth seal 522 is coupled to a second wall 526 of the enclosure 120 opposite the first wall 524. The third and fourth seals 510, 522 of FIG. 5 extend along the axis 512 between the opposing sides of the sixth sensor 502. In some examples, the third wiper 508, the third seal 510, and/or the fourth seal 522 extend along only a portion (e.g., a sensing area of the outer surface 520) of the length of the sixth sensor 502. In some examples, the third wiper 508, the third seal 510, and/or the fourth seal 522 define a perimeter of an aperture 528 disposed on the enclosure 120 between the first and second walls 524, 526.

In some examples, the second vehicle cavity 507 is formed and/or defined by one or more of the exterior vehicle surface 114, the enclosure 120 (e.g., the first and second walls 524, 526), the third wiper 508, the third seal 510, and/or the fourth seal 522. That is, in some examples, the third wiper 508, the third seal 510, and/or the fourth seal 522 are positioned at least partially or entirely in the enclosure 120. Although the example of FIG. 5 depicts the sixth sensor 502 as being partially exposed via the aperture 528, in some examples, the sixth sensor 502 is positioned entirely within the second cavity 507 behind a transparent surface (e.g., glass) of the enclosure 120.

Figure 6:
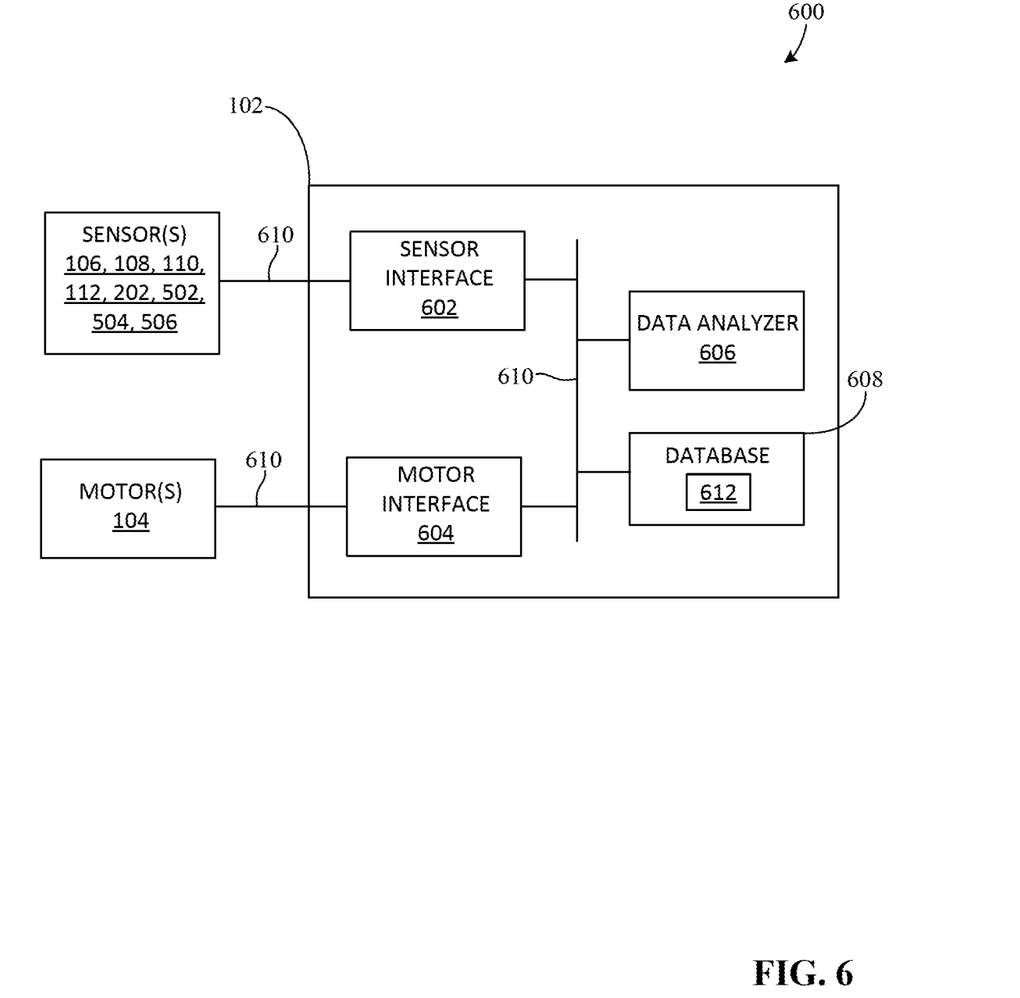
FIG. 6 is a block diagram of an example sensor cleaning system to implement the examples disclosed herein.

FIG. 6 is a block diagram of an example sensor cleaning system 600 to implement the examples disclosed herein. According to the illustrated example of FIG. 6, the sensor cleaning system 600 includes the vehicle controller 102 of FIG. 1, which includes an example sensor interface 602, an example motor interface 604, an example data analyzer 606, and an example database 608. The sensor cleaning system 600 also includes one or more of the sensor(s) 106, 108, 110, 112 of FIG. 1, one or more of the motor(s) 104 of FIG. 1, the fifth sensor 202 of FIGS. 2, 3, 4A, and 4B, and/or one or more of the sensor(s) 502, 504, 506 of FIG. 5. The sensor cleaning system 600 of FIG. 6 is communicatively coupled to the sensor(s) 106, 108, 110, 112 and the motor(s) 104 via one or more example communication links 610 such as, for example, a signal or transmission wire, a bus, radio frequency, etc.

In particular, the sensor cleaning system 600 detects, via example data 612 (e.g., stored in the database 608), when the debris 222 is on or near at least portion of a particular sensor 106, 108, 110, 112, 202, 502, 504, 506 and, in response, controls the motor(s) 104 to removes the debris 222 from that particular sensor 106, 108, 110, 112, 202, 502, 504, 506. To determine when to initiate debris removal, the data analyzer 606 processes the data 612 to identify a particular signature in the data 612 and/or a sensor condition (e.g., poor sensor visibility) that indicates one or more of the sensor 106, 108, 110, 112, 202, 502, 504, 506 may be operating improperly, as discussed further below.

The sensor interface 602 of FIG. 6 is communicatively coupled, via the link(s) 610, to the sensor(s) 106, 108, 110, 112, 202, 502, 504, 506 to receive sensor data therefrom. As such, at least some of the data 612 of FIG. 6 includes positional data, distance data, image data, and/or any other suitable data associated with the vehicle 100. In particular, at least some of the data 612 is associated with autonomous functionality of the vehicle 100.

The motor interface 604 of FIG. 6 is communicatively coupled, via the link(s) 610, to the motor(s) 104. In particular, the motor interface 604 provides control command(s) or signal(s) and/or power to the motor(s) 104, thereby generating a force and/or a torque for controlling movement of the sensor(s) 106, 108, 110, 112, 202, 502, 504, 506 and/or components associated therewith (e.g., the mounting plate 206). In some examples, the motor interface 604 controls the motor(s) 104 to operate the pump 226 to change the parameter(s) of the fluid 130.

In some examples, the motor interface 604 control(s) the motor(s) 104 to move the sensor(s) 106, 108, 110, 112, 202, 502, 504, 506 through one or more predetermined ranges of movement (e.g., a linear range of movement and/or a rotational range of movement), which may be stored in the database 608. For example, the motor interface 604 causes the fifth sensor 202 to move linearly in the first direction 210 by a first predetermined distance (e.g., 0.5 inches, 1 inch, 2 inches, etc.) from the first position toward the second position. Further, in some such examples, the motor interface 604 causes the fifth sensor 202 to move linearly in the second direction 212 by a second predetermined distance (e.g., 0.5 inches, 1 inch, 2 inches) from the second position toward the first position.

In another example, the motor interface 604 causes the sixth sensor 502, the seventh sensor 504, and/or the eighth sensor 506 to rotate in the first rotational direction 514 by about 180 degrees from the third position toward fourth position. Further, in such examples, the motor interface 604 causes the sensor(s) 502, 504, 506 to rotate in the second direction 516 by about 180 degrees from the fourth position toward the third position.

The database 608 of FIG. 6 stores and/or provides access to at least a portion of the data 612. In particular, the database is communicatively coupled, via the link(s) 610, to one or more of the sensor interface 602, the motor interface 604, and/or the data analyzer 606. For example, database 608 receives data from the sensor interface 602, the motor interface 604, and/or the data analyzer 606. Conversely, the database 608 provides data to the sensor interface 602, the motor interface 604, and/or the data analyzer 606.

As previously mentioned, the data analyzer 606 of FIG. 6 processes at least a portion of the data 612 to determine when to perform sensor cleaning and/or otherwise enable control of the motor(s) 104. In particular, the data analyzer 606 performs one or more calculations and/or comparisons associated with determining the particular signature in the data 612 and/or the sensor condition, for example, via one or more related equations and/or algorithms. In response to providing a positive determination, the data analyzer 406 enables the motor interface 604 to control the motor(s) 104.

In some examples, based on the data 612, the data analyzer 606 calculates and/or determines a characteristic and/or a parameter associated with a particular sensor 106, 108, 110, 112, 202, 502, 504, 506 such as, for example, a degree of visibility and/or a field of view. The data analyzer 606 then compares the characteristic and/or the parameter to a predetermined criterion (e.g., a threshold value of visibility and/or a threshold field of view stored in the database 608), which may indicate whether the particular sensor 106, 108, 110, 112, 202, 502, 504, 506 has debris thereon. In such examples, when the comparison satisfies the criterion, the data analyzer 606 determines to enable control of the motor(s) 104 and clean that particular sensor 106, 108, 110, 112, 202, 502, 504, 506. The data analyzer 606 may repeatedly attempt to determine and/or identify the data signature and/or the sensor condition in this manner (e.g., during operation of the vehicle 100). Further, in some examples, the data analyzer 606 similarly analyzes multiple (e.g., each) of the vehicle sensor(s) 106, 108, 110, 112, 202, 502, 504, 506 to identify debris thereon and/or clean the same.

Although an example sensor cleaning system 600 is illustrated in FIG. 6, one or more of the elements, processes, and/or devices depicted in FIG. 6 may be combined, divided, re-arranged, omitted, eliminated, and/or implemented in any other way. Further, the example sensor cleaning system 600 of FIG. 6 may include one or more elements, processes, and/or devices in addition or alternatively to those illustrated in FIG. 6, and/or may include more than one of any or all of the illustrated elements, processes, and devices.

Additionally, one or more of the example elements 102, 602, 604, 606, 608 and/or the example sensor cleaning system 600 of FIG. 6 may be implemented by hardware, software, firmware and/or any combination of thereof. For example, any of the example element(s) 102, 602, 604, 606, 608 and/or the example sensor cleaning system 600 could be implemented by one or more circuits (e.g., an analog or digital circuit, a logic circuit, a programmable processor, etc.). Further, in some examples, at least one of the example element(s) 102, 602, 604, 606, 608 and/or the example sensor cleaning system 600 include(s) a tangible machine-readable storage device or storage disk (e.g., a memory storing the software and/or firmware).

Figure 7:
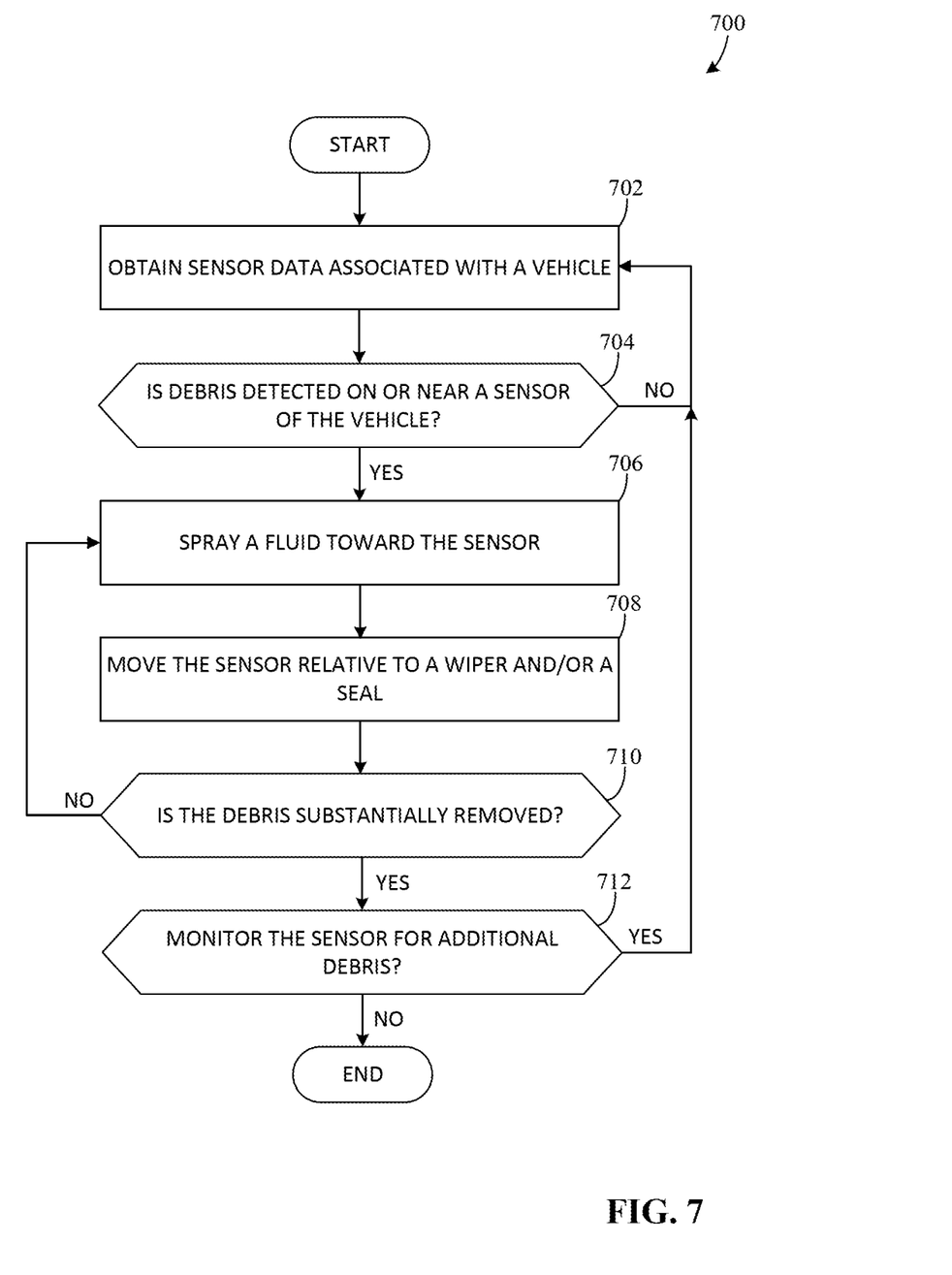
FIG. 7 is a flowchart representative of an example method that may be executed to implement the example sensor cleaning system of FIG. 6.

A flowchart representative of example hardware logic or machine-readable instructions for implementing the example sensor cleaning system 600 of FIG. 6 is shown in FIG. 7. The machine-readable instructions may be a program or portion of a program for execution by a processor (e.g., the CPU 802 (shown in FIG. 8)), which is discussed in greater detail below in connection with FIG. 8. The program may be embodied in software stored on a tangible machine-readable storage medium such as a CD-ROM, a floppy disk, a hard drive, or a memory associated with the processor. Alternatively, the entire program and/or parts thereof could be executed by a different device and/or embodied in firmware or dedicated hardware.

The example processes of FIG. 7 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example method of FIG. 7 may be implemented using coded instructions stored on a non-transitory machine-readable medium in which information is stored for any duration, which includes any type of computer or machine readable storage device or disk and excludes propagating signals and transmission media.

FIG. 7 is a flowchart representative of an example method 700 that can be executed to implement the sensor cleaning system 600 of FIG. 6. The example method 700 of FIG. 7 can be implemented in any of the example vehicle 100 of FIG. 1A, the first sensor configuration 200 of FIGS. 2, 3, 4A and 4B, the second sensor configuration 500 of FIG. 5, and/or the sensor cleaning system 600 of FIG. 6.

The method 700 of FIG. 7 begins by obtaining sensor data associated with a vehicle (block 702). In some examples, the sensor cleaning system 600 of FIG. 6 obtains (e.g., via the sensor interface 602) at least some of the data 612 associated with the vehicle 100 from the sensor(s) 106, 108, 110, 112, 202, 502, 504, 506.

The method 700 of FIG. 7 also includes determining whether debris is detected on or near a sensor of the vehicle (block 704). In some examples, the sensor cleaning system 600 of FIG. 6 processes (e.g., via the data analyzer 606) the data 612 to facilitate a determination, as previously disclosed. Based on such processing, the sensor cleaning system 600 of FIG. 6 detects and/or determines (e.g., via the data analyzer 606) when the debris 222 is on or near (or likely on or near) at least one of the sensor(s) 106, 108, 110, 112, 202, 502, 504, 506.

In some examples, if the sensor cleaning system 600 determines that the debris 222 is on or near (or likely on or near) the sensor(s) 106, 108, 110, 112, 202, 502, 504, 506 (block 704: YES), control of the method 700 proceeds to block 706. In some examples, if the sensor cleaning system 600 determines that the debris 222 is not on or near (or not likely on or near) the sensor(s) 106, 108, 110, 112, 202, 502, 504, 506 (block 704: NO), control of the method 700 returns to block 702.

The method 700 of FIG. 7 also includes spraying a fluid toward the sensor (block 706). In some examples, the sensor cleaning system 600 of FIG. 6 controls (e.g., via the motor interface 604) one or more of the motor(s) 104, thereby spraying the fluid 130 toward the sensor(s) 106, 108, 110, 112, 202, 502, 504, 506 via the nozzle(s) 126, 128, 518 and/or the pump 226.

The method 700 of FIG. 7 also includes moving the sensor relative to a wiper and/or a seal (block 708). In some examples, the sensor cleaning system 600 of FIG. 6 controls (e.g., via the motor interface 604) the motor(s) 104 to move the sensor(s) 106, 108, 110, 112, 202, 502, 504, 506 relative to the wiper(s) 214, 406, 508 and/or the seal(s) 216, 408, 510, 522, thereby removing the debris 222 and/or the fluid 130. In some examples, the sensor cleaning system 600 moves the sensor(s) 106, 108, 110, 112, 202, 502, 504, 506 in accordance with one or more predetermined movement ranges, as previously disclosed.

The method 700 of FIG. 7 also includes determining whether the debris is substantially removed (block 710). In some examples, the sensor cleaning system 600 of FIG. 6 performs additional processing (e.g., via the data analyzer 606) of the data 612. Based on such processing, the sensor cleaning system 600 of FIG. 6 detects and/or determines (e.g., via the data analyzer 606) whether the debris 222 is substantially removed from the sensor(s) 106, 108, 110, 112, 202, 502, 504, 506.

In some examples, if the sensor cleaning system 600 determines that the debris 222 is substantially removed (block 710: YES), control of the method 700 proceeds to block 712. In some examples, if the sensor cleaning system 600 determines that the debris 222 is not substantially removed (block 710: NO), control of the method 700 returns to block 706.

The method 700 of FIG. 7 also includes determining whether to monitor the sensor for additional debris (block 712). In some examples, the sensor cleaning system 600 of FIG. 6 determines (e.g., via the data analyzer 606) whether to monitor the sensor(s) 106, 108, 110, 112, 202, 502, 504, 506. In some examples, if the sensor cleaning system 600 determines not to performing monitoring (e.g., when the vehicle 100 is not being operated) (block 712: NO), the method 700 ends. In some examples, if the sensor cleaning system 600 determines to perform monitoring (e.g., when the vehicle 100 is being operated) (block 712: YES), control of the method 700 returns to block 702.

Although the example method 700 is described in connection with the flowchart of FIG. 7, other methods of implementing the example sensor cleaning system 600 may alternatively be used. For example, the order of execution of the blocks may be changed, and/or some of the blocks described may be changed, eliminated, or combined.

Figure 8:
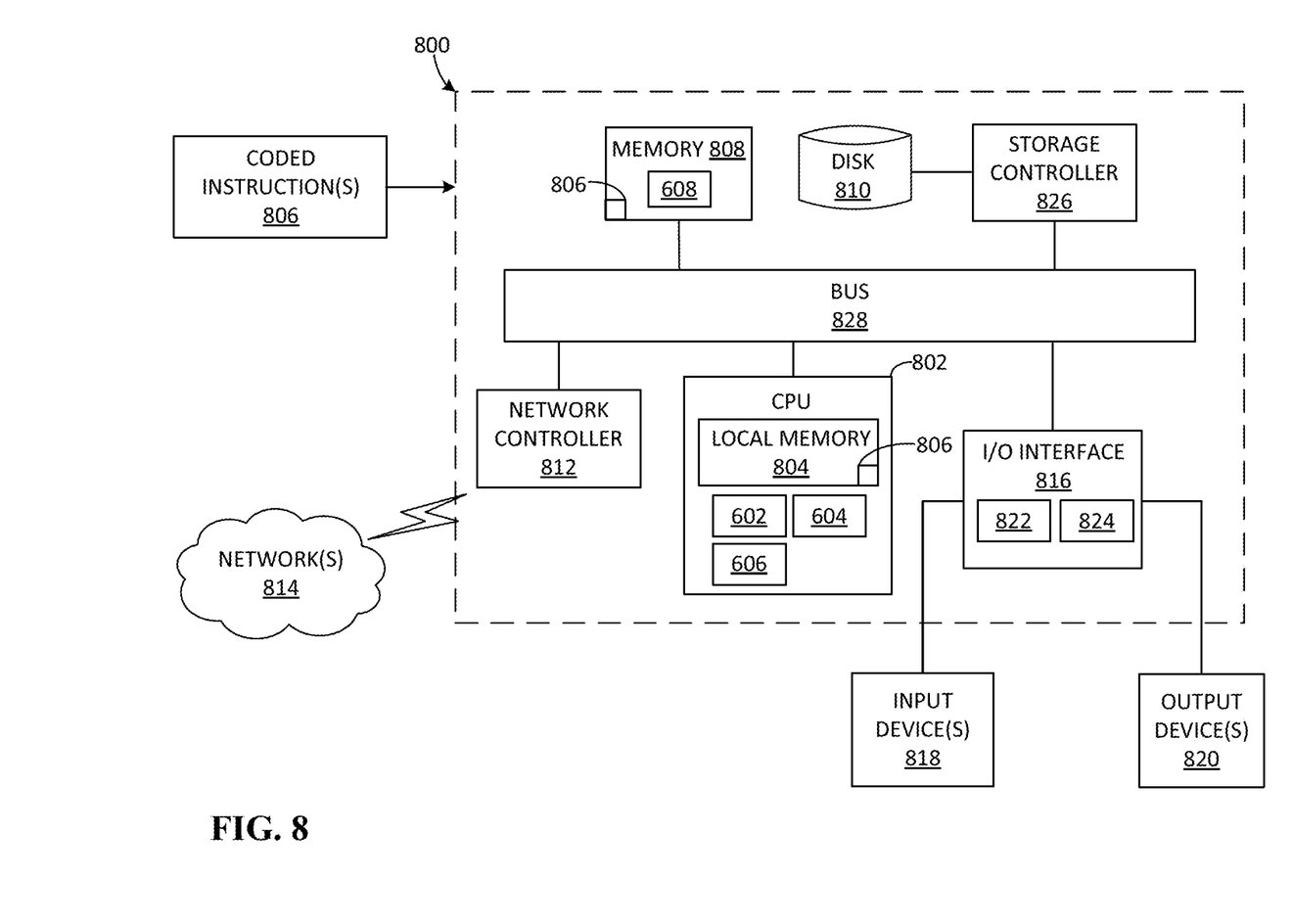
FIG. 8 is a block diagram of an example processor platform structured to execute instructions to carry out the example method of FIG. 7 and/or, more generally, to implement the example sensor cleaning system of FIG. 6.

FIG. 8 is a block diagram of an example processor platform 800 capable of executing instructions to implement the method of FIG. 7 and the sensor cleaning system 600 of FIG. 6. For example, the processor platform 800 can be a personal computer, a server, a mobile device (e.g., a cell phone, a smart phone, a tablet, etc.) or any other type of computing device. According to the illustrated example of FIG. 8, the processor platform 800 includes a central processing unit (CPU) 802 (sometimes referred to as a processor), which is hardware (e.g., one or more integrated circuits, logic circuits, microprocessors, etc.). The CPU 802 of FIG. 8 includes a local memory 804 such as, for example, a cache. According to the illustrated example of FIG. 8, the CPU 802 implements the example sensor interface 602, the example motor interface 604, and the example data analyzer 606.

Coded instruction(s) 806 to implement the method of FIG. 7 may be stored in a main memory 808 of the processing platform 800. The memory 808 may include a volatile memory (e.g., random access memory device(s) such as Dynamic Random Access Memory (DRAM)) and a non-volatile memory (e.g., flash memory). Such processes and/or instructions may also be stored on a storage medium disk 810 associated with the processor platform 800, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 800 communicates, such as a server or computer.

Further, the claimed advancements may be provided as a utility application, background daemon, or component of an operating system, or combination thereof, executing in conjunction with the CPU 802 and an operating system such as, for example, Microsoft Windows 7, UNIX, Solaris, LINUX, Apple MAC-OS or any other system(s) known to those skilled in the art.

The hardware elements in order to achieve the processing platform 800 may be realized by various circuitry elements, known to those skilled in the art. For example, the CPU 802 may be a Xenon or Core processor from Intel of America or an Opteron processor from AMD of America, or may be other processor types that would be recognized by one of ordinary skill in the art. Alternatively, the CPU 802 may be implemented on an FPGA, ASIC, PLD or using discrete logic circuits, as one of ordinary skill in the art would recognize. Further, the CPU 802 may be implemented as multiple processors cooperatively working in parallel to perform the instructions of the inventive processes described above.

In some examples, the processor platform 800 of FIG. 8 also includes a network controller 812 such as, for example, an Intel Ethernet PRO network interface card from Intel Corporation of America for interfacing with one or more networks 814. As can be appreciated, the network(s) 814 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 814 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 800 of FIG. 8 includes a general purpose I/O interface circuit 816 that interfaces and/or otherwise communicates with one or more input devices 818 and/or one or more output devices 820. The I/O interface circuit 816 of FIG. 8 may be implemented as an Ethernet interface, a universal serial bus (USB), a PCI express interface, and/or any other type of standard interface.

The input devices 818 are connected to the I/O interface 816 and may include, for example, a keyboard, a mouse, a touchscreen, a button, a microphone, a voice recognition system, a camera, and/or any other suitable device(s) for enabling a user to input data and/or commands to the CPU 802. As such, in some examples, the I/O interface circuit 816 typically includes a display controller 822 such as, for example, a NVIDIA GeForce GTX or Quadro graphics adaptor from NVIDIA Corporation of America for interfacing with a display (e.g., a Hewlett Packard HPL2445w LCD monitor).

The output device(s) 820 are also connected to the I/O interface circuit 816 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 824 such as, for example, Sound Blaster X-Fi Titanium from Creative, to interface with a speaker and/or a microphone.

The processor platform 800 of FIG. 8 also includes a general purpose storage controller 826 that connects the storage medium disk 810 with a communication bus 828. The storage controller 826 may also control access to the memory 808. The communication bus 828 of FIG. 8 may be an ISA, EISA, VESA, PCI, etc. for interconnecting all of the components of the processor platform 800. For example, the CPU 802 communicates with the main memory 808 via the bus 828.

It will be appreciated that the systems, apparatus, and methods disclosed in the foregoing description provide numerous advantages. Examples disclosed herein enable the effective removal of debris and/or fluid from one or more vehicle sensors, which improves vehicle safety and/or autonomous vehicle functionality while reducing associated costs.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof.

Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An apparatus, comprising:
    a sensor of a vehicle;
    a motor operatively coupled to the sensor to enable the sensor to move linearly within a cavity of the vehicle along an axis of the cavity between a first position and a second position, the cavity including a first side surface and a second bottom surface, the axis of the cavity extending vertically;
    a mounting plate on which the sensor is mounted, the mounting plate extending laterally farther from the axis than the sensor, the mounting plate beings coupled to the motor so as to move linearly along the axis of the cavity, the mounting plate abutting the second bottom surface of the cavity when the sensor is in the second position; and
    a wiper fixedly coupled to the vehicle and partially defining the cavity, an edge of the wiper to engage the sensor when the sensor moves to remove debris,
    wherein the edge of the wiper remains engaged with an outer surface of the sensor as the sensor moves between the first position and the second position, and
    wherein an end of the sensor is further from an exterior surface of the vehicle in a direction parallel to the axis of the cavity in the first positon than in the second position.

2. The apparatus of claim 1, wherein an outer surface of the wiper and the outer surface of the sensor are substantially flush with the exterior surface of the vehicle when the sensor is in the second position which is a lowered position.

3. The apparatus of claim 1, further including one or more nozzles operatively coupled to the vehicle and positioned proximate to the sensor, the one or more nozzles configured to spray a fluid on the sensor.

4. The apparatus of claim 3, wherein the one or more nozzles are radially distributed relative to an axis of the sensor.

5. The apparatus of claim 3, further including a seal coupled to the vehicle and at least partially disposed in the cavity, the seal to engage the sensor to remove the fluid when the sensor moves.

6. The apparatus of claim 5, wherein the wiper or the seal surrounds the outer surface of the sensor.

7. The apparatus of claim 6, wherein the wiper or the seal is concentric with the sensor.

8. The apparatus of claim 7, wherein the seal includes an O-ring.

9. The apparatus of claim 5, wherein the seal is disposed in a seal groove that is positioned in the cavity.

10. The apparatus of claim 1, wherein the sensor has a first shape and the cavity has a second shape that matches the first shape.

11. The apparatus of claim 1, wherein the wiper includes at least a second edge to cooperatively engage the sensor with the first edge.

12. A vehicle, comprising:
    a cavity formed by an exterior surface of the vehicle to receive a sensor, the cavity including a first side surface and a second bottom surface, an axis of the cavity extending vertically;
    a mounting plate on which the sensor is mounted and which moves linearly along the axis of the cavity the mounting plate extending laterally farther from the axis than the sensor;
    a wiper partially defining the cavity to engage the sensor when the sensor moves linearly along an axis of the cavity between a first position and a second position to remove debris, an edge of the wiper remaining engaged with an outer surface of the sensor as the sensor moves between the first position and the second position; and
    a seal partially defining the cavity to engage the sensor, wherein the mounting plate abuts the second bottom surface of the cavity when the sensor is in the second position.

13. The vehicle of claim 12, wherein the wiper and the seal are coupled to a sensor enclosure of the vehicle.

14. The vehicle of claim 13, wherein the wiper and the seal are positioned on a first wall of the sensor enclosure and extend along an axis of the sensor.

15. The vehicle of claim 14, wherein the seal is a first seal, further including a second seal to engage the sensor and coupled to a second wall of the sensor enclosure, the sensor positioned between the first and second seals.

* * * * *